United States Patent [19]

Kiss

[11] 4,124,838
[45] Nov. 7, 1978

[54] APPARATUS FOR POSITION DETERMINATION

[75] Inventor: William Kiss, Shelton, Conn.

[73] Assignee: Science Accessories Corporation, Southport, Conn.

[21] Appl. No.: 755,156

[22] Filed: Dec. 29, 1976

[51] Int. Cl.² ............................. G01S 5/18; G01S 9/66
[52] U.S. Cl. .................................... 340/1 R; 340/1 C; 343/112 PT
[58] Field of Search ..................... 340/1 C, 16 R, 1 R; 343/112 PT

[56] References Cited

U.S. PATENT DOCUMENTS

| | | | |
|---|---|---|---|
| 3,653,031 | 3/1972 | Hlady et al. | 340/1 C |
| 3,838,212 | 9/1974 | Whetstone et al. | 340/1 C |
| 4,012,588 | 3/1977 | Davis et al. | 340/1 C |

*Primary Examiner*—Richard A. Farley
*Attorney, Agent, or Firm*—Martin Novack

[57] ABSTRACT

The disclosure is directed to an apparatus for position determination in a data space, the position determination preferably being in the form of rectangular coordinates. First and second orthogonally oriented elongated microphones are provided. The microphones approximately define adjacent edges of a substantially rectangular data space. A passive movable element, such as a stylus or puck, is provided as being movable in the data space. Means are provided for periodically generating sound waves at a source position spaced from the movable element. Preferably, the source of sound waves is located such that the sound waves emanate from about the corner of the data space defined by the intersection of said adjacent edges. Timing means, coupled to the microphones and synchronized with the generation of the sound waves, are provided for measuring the transit times of the sound waves reflected off the movable element to the microphones. To obtain the position of the movable element in a desired coordinate system, computing means are employed to determine the positional coordinates of the movable element, such as in rectangular coordinates.

6 Claims, 2 Drawing Figures

APPARATUS FOR POSITION DETERMINATION

BACKGROUND OF THE INVENTION

This invention relates to graphical data apparatus and, more particularly, to an apparatus for locating the position of a movable element in a data space.

Graphical data systems have been employed for some time to determine the position of a movable element or stylus in a defined coordinate system. Earlier systems employed a stylus in the form of a writing pen or pointer mechanically coupled to a set of arms for translating the movement of the stylus into a sequence of usable information signals. Such arrangements proved generally unsatisfactory in that they presented undesirable frictional and inertial limitations.

Subsequently developed graphical data systems, called "digitizers", utilize tablets which have imbedded conductors. These systems, which involve the considerable expense of tablet manufacture, are satisfactory for some uses but are inflexible in that they are limited to applications where a tablet can be employed.

In the U.S. Pat. Nos. 3,838,212 and 3,731,273 there are disclosed graphical data systems which utilize a stylus that generates periodic sound waves and microphones which define a coordinate area. Circuitry is provided which measures the transit time of the sound waves between the stylus and the microphones, and the coordinates of the stylus are determined from the transit times which are translatable to distances since the speed of sound in air is essentially a known quantity. These types of systems are presently in commercial use and offer a distinct advantage over conventional data tablets since no tablet is required and the microphones can be positioned around any desired work space. Operation is considered satisfactory but there are aspects of these types of systems which could stand improvement. For example, the stylus in such systems is "active" and generally requires wire connections for energizing the sound source. In addition to the effects of the wire on manual dexterity, the sound source, typically a relatively high voltage spark, can cause interference in some instances; e.g., where the data area corresponds to an electronic display like a CRT or a gas discharge display.

In the co-pending U.S. patent application Ser. No. 608,917, now U.S. Pat. No. 4,012,558 assigned to the same assignee as the present application, there is disclosed a digitizer apparatus which employs a passive movable element (i.e. a stylus or "puck") which is movable in a data space. First and second spaced receivers are provided and sound waves are periodically generated at a source position spaced from the passive movable element. Timing means, coupled to the receivers and synchronized with the generation of the sound waves, measure the transit time of the sound waves reflected off the movable element to the receivers. The instantaneous rectangular coordinates of the movable element are automatically computed from the measured transit times. In a disclosed embodiment in the referened patent application, a pair of cylindrical microphones are employed to effectively serve as "point" receivers.

The present invention is directed to an apparatus of the type disclosed and claimed in the referenced application, and is an improvement thereon.

SUMMARY OF THE INVENTION

The present invention is directed to an apparatus for position determination in a data space, the position determination preferably being in the form of rectangular coordinates. First and second orthogonally oriented elongated microphones are provided. The microphones approximately define adjacent edges of a substantially rectangular data space. A passive movable element, such as a stylus or puck, is provided as being movable in the data space. Means are provided for periodically generating sound waves at a source position spaced from the movable element. Preferably, the source of sound waves is located such that the sound waves emanate from about the corner of the data space defined by the intersection of said adjacent edges. Timing means, coupled to the microphones and synchronized with the generation of the sound waves, are provided for measuring the transit times of the sound waves reflected off the movable element to the microphones. To obtain the position of the movable element in a desired coordinate system, computing means are employed to determine the positional coordinates of the movable element, such as in rectangular coordinates.

Applicant has discovered that the defined position determining apparatus, which is a specie of the type of system disclosed and claimed in the above-identified co-pending patent application, has substantial advantages in some respects over a "point" microphone specie of the system. In particular, since only a fraction of the transmitted energy is reflected off the movable element, the elongated microphones are found to be advantageous in that they tend to maximize the total received sound energy flux and thereby enhance the signal to noise ratio of the apparatus. Also, as will be described, the geometrical nature of the travel paths in the present invention facilitate simplification of the circuitry utilized to convert the measured transit times to an indication of rectangular coordinates.

Further features and advantages of the invention will become more readily apparent from the following detailed description when taken in conjunction with the accompanying drawings.

DESCRIPTION OF THE PREFERRED EMBODIMENT

Figure 1:
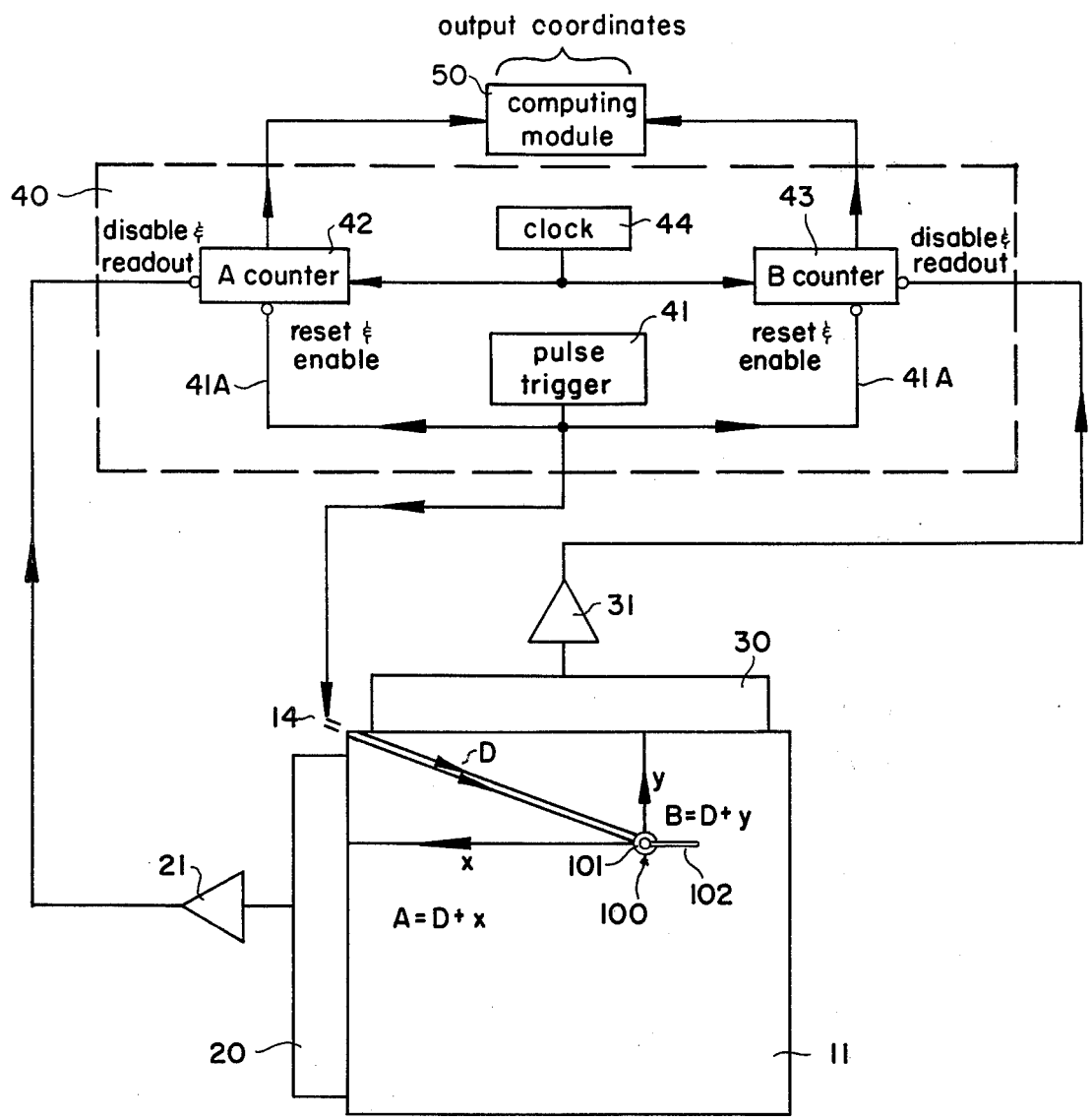
FIG. 1 is a schematic representation, partially in block form, of a position locating apparatus in accordance with an embodiment of the invention.

In FIG. 1 a data space is generally defined by the surface area just above a generally flat surface 11, although it will become clear that the data space in accordance with the invention is not necessarily restricted and that the surface is supportive only and performs no active function in the operation of the invention. As a practical matter, the surface 11 may be a glass sheet for supporting documents for writing purposes and sufficiently transparent to enable tracings to be made, or it may be the surface of a display device such as a CRT display or a gas discharge display upon which specific points, lines or areas are to be precisely located. A pair of elongated microphones 20 and 30 are oriented substantially orthogonally along adjacent edges of the surface 11. The microphones are preferably, although not necessarily, of the capacitive type as described in the U.S. Pat. No. 3,838,212, assigned to the same assignee as the present invention.

A movable element or stylus, whose position is to be determined, is labeled with the reference numeral 100. In the present embodiment, the movable element 100 is a small cylindrical disk or puck 101 having a hand-held extension 102 which is pivotally mounted thereon. The bottom center of the disk 101 may be provided with a writing means, if desired (not shown). The movable element or puck 100 is electrically passive and requires no electronic connections. It will be understood that the passive stylus can be of any desired form, such as an ordinary pen or pencil or even a human finger used as a pointer, although a rigid relatively uniform material which efficiently reflects sound waves is preferred.

A source of periodic sound waves, such as the electrode pair 14 which has a gap for producing an electrical discharge in the form of a spark, is provided at about the corner which is common to the adjacent microphones 20 and 30. The spark is constituted by a sudden discontinuous discharge of electricity through air and produces a fast rise time sound pulse or wave radiating from the point of discharge. A spark-generating source of this type is well known in the art and is described, for example, in the U.S. Pat. No. 3,838,212. It will be understood, however, that any suitable source of sound or shock waves can be employed.

The periodic sparks are generated by source 14 in response to a spark triggering circuit which also provides reset and enable signals to counters 42 and 43 over lines 41A. The counters count clock pulses from a clock 44. The shock wave created by the spark propogates through the atmosphere (as an expanding generally spherically shaped wave) until it encounters the puck 100, whereupon a portion of the sound energy will be reflected toward the microphones 20 and 30. The shortest distance of travel from the source to the puck 100 and then to the microphones 20 and 30 is the path defined by a straight line between the source and the puck (designated "D") and then a further line from the puck to each microphone, these latter lines being perpendicular to the respective microphones and being designated as x and y in FIG. 1. The shortest total travel distance for the path to the microphone 20 is designated A and the shortest travel distance from the source to microphone 30 is designated B. The travel time durations for A and B are determined by circuitry 40, shown in dashed line, which comprises an "A counter" 42 associated with the microphone 20, a "B counter" 43 associated with the microphone 30, and the spark trigger circuit and clock 44, as already set forth. Coincident with generation of the spark, the counters 42 and 43 are enabled to begin counting pulses from clock 44. Upon initial reception of the sound wave front, the microphones 20 and 30, which generally receive the wave front at different times, produce output voltages which are coupled to high gain bandpass amplifiers 21 and 31, respectively. The spark shock wave produces a fast rise time electrical impulse upon impinging on the microphone surface, and the bandpass amplifiers allow only the fast rise time portion of the electrical pulse to pass while blocking out noise signals outside the band. As is known in the art, the amplifiers include threshold discriminators which provide a well defined signal in response to a given characteristic of the energy received at the microphone, for example a particular zero crossing. The amplifier outputs are operative to disable the counters 42 and 43 and also to cause the reading out of the respective counts which are indicative of the respective total distances A and B. The readings are, of course, dependent upon the speed of sound in air which is essentially a known quantity. Since the velocity of sound in air varies with temperature, appropriate velocity compensation techniques can be employed, as known in the art, to generate suitable correction signals. These types of techniques, as well as further known refinements in the processing circuitry 40, are disclosed in the U.S. Pat. Nos. 3,731,273 and 3,838,212.

The outputs of the counters 42 and 43 are coupled to a computing module 50 which converts the counts into desired positional coordinates, such as rectangular coordinates. In FIG. 1, assume that the source 14 is at the origin of a rectangular coordinate system and that the puck 100 is at coordinates designated $(x, y)$. (Assume, further, that the puck 100 is of sufficiently small diameter such that it can be considered as a "point" in these calculations.) The following realtionships can be set forth:

$$A = D + x \qquad (1)$$

$$B = D + y \qquad (2)$$

$$D^2 = A^2 - 2Ax + x^2 \qquad (3)$$

$$D^2 = B^2 - 2By + y^2 \qquad (4)$$

$$A - x = B - y \qquad (5)$$

From equations (3) and (4) it follows that:

$$y^2 = B^2 - 2AB + 2Bx + A^2 - 2Ax + x^2 \qquad (6)$$

$$x^2 = A^2 - 2AB + 2Ay + B^2 - 2By + y^2 \qquad (7)$$

Combining equations (5) and (6) and collecting terms gives:

$$x^2 + 2xB + B^2 = 2AB \qquad (8)$$

Solving for $x$ gives:

$$x = \sqrt{2AB} - B \qquad (9)$$

Combining equations (5) and (7) and collecting terms gives:

$$y^2 = -A^2 + 2AB - 2Ay, \text{ which yields} \qquad (10)$$

$$y = \sqrt{2AB} - A \qquad (11)$$

Figure 2:
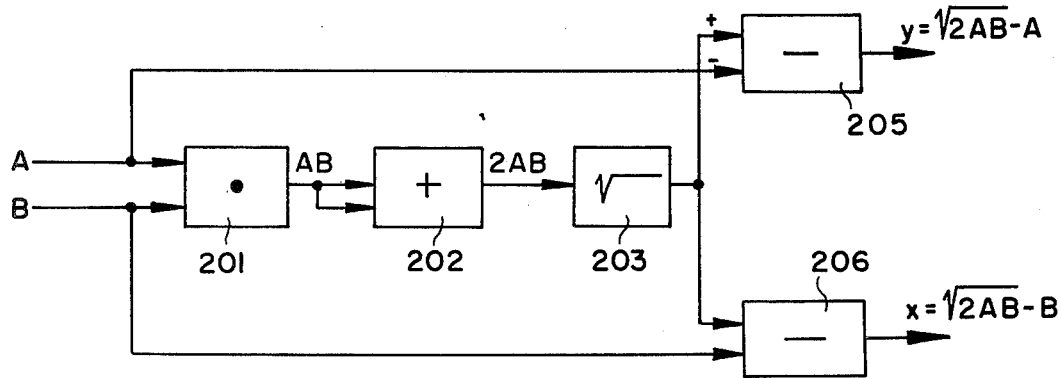
FIG. 2 is a block diagram of an embodiment of the computing module of FIG. 1.

Referring to FIG. 2, there is shown a circuit which can be utilized in the computing module 150 for obtaining the rectangular coordinates expressed by equations (9) and (11). The subsystem of FIG. 2 utilizes conventional adding, subtraction, multiplication, and square root circuits. It will be appreciated, however, that the computing module 150 may alternatively comprise any suitable form of digital or analog computing means or special purpose circuitry. Counts representative of A and B are coupled to a multiplier circuit 201 which generates a signal representative of AB. An adder 202 is utilized to add AB to itself to form 2AB. A square root circuit 203 then forms a signal representative of the quantity $\sqrt{2AB}$. This signal is coupled to the positive terminals of each of a pair of difference circuits 205 and 206. The difference circuits 205 receives the signal representative of A at its negative input terminal and the difference circuit 206 receives the signal representative of B at its negative input terminal. Accordinaly, the outputs of blocks 205 and 206 generate signals which are representative of instantaneous $(x, y)$ coordinates of the puck 100.

I claim:

1. Apparatus for position determination in a data space, comprisng:

first and second orthogonally oriented elongated microphones, said microphones defining adjacent edges of a substantially rectangular data space;

a passive movable element which is movable in said data space;

means for periodically generating sound waves at a source position spaced from said movable element, said source position being located such that the sound waves emanate from about the corner of the data space defined by the intersection of said adjacent edges; and timing means coupled to said microphones and synchronized with the generation of said sound waves for measuring the transit times of the sound waves reflected off the movable element to said microphones.

2. Apparatus as defined by claim 1 further comprising computing means for translating the measured transit times to rectangular coordinates of the movable element.

3. Apparatus as defined by claim 2 wherein said computing means is operative to obtain one coordinate of said rectangular coordinates as a function of the square root of twice the product of the two transit times minus one of the transit times, and to obtain the other coordinate of the rectangular coordinates as a function of the square root of twice the product of the two transit times minus the other of the transit times.

4. Apparatus for determining the position of a passive movable element which is movable in a data space, comprising:

first and second orthogonally oriented elongated microphones, said microphones defining adjacent edges of a substantially rectangular data space;

means for periodically generating sound waves at a source position spaced from said movable element, said source position being located such that the sound waves emanate from about the corner of the data space defined by the intersection of said adjacent edges; and timing means coupled to said microphones and synchronized with the generation of said sound waves for measuring the transit times of the sound waves reflected off the movable element to said microphones.

5. Apparatus as defined by claim 4 further comprising computing means for translating the measured transit times to rectangular coordinates of the movable element.

6. Apparatus as defined by claim 5 wherein said computing means is operative to obtain one coordinate of said rectangular coordinates as a function of the square root of twice the product of the two transit times minus one of the transit times, and to obtain the other coordinate of the rectangular coordinates as a function of the square root of twice the product of the two transit times minus the other of the transit times.

* * * * *